(12) United States Patent
Homsi et al.

(10) Patent No.: US 6,705,268 B2
(45) Date of Patent: Mar. 16, 2004

(54) ENGINE NOISE BARRIER

(75) Inventors: Emile N. Homsi, Union, NJ (US);
Thomas J. Krolick, Parlin, NJ (US);
Chul S. Lee, Northville, MI (US);
Peter K. Han, Montville, NJ (US); **Val
A. Kagan**, Morristown, NJ (US)

(73) Assignee: BASF Aktiengesellschaft,
Ludwigshafen (DE)

( * ) Notice: Subject to any disclaimer, the term of this patent is extended or adjusted under 35 U.S.C. 154(b) by 0 days.

(21) Appl. No.: 09/960,157

(22) Filed: Sep. 21, 2001

(65) Prior Publication Data

US 2003/0062012 A1 Apr. 3, 2003

(51) Int. Cl.⁷ .............................................. F02M 35/12
(52) U.S. Cl. ..................................................... 123/184.61
(58) Field of Search .................... 123/184.61, 184.21,
123/184.42, 184.57; 29/890.08; 181/183,
198, 204, 214, 222, 229, 240, 252, 256,
296, 258

(56) References Cited

U.S. PATENT DOCUMENTS

| | | | |
|---|---|---|---|
| 4,222,360 A | * 9/1980 | Fujikawa et al. | 123/193 C |
| 4,903,645 A | * 2/1990 | Borger | 123/184.61 |
| 5,353,752 A | * 10/1994 | Suzuki | 123/184.61 |
| 5,354,802 A | 10/1994 | Shiwaku et al. | 524/494 |
| 5,370,087 A | * 12/1994 | Guimond et al. | 123/546 |
| 5,400,296 A | 3/1995 | Cushman et al. | 367/1 |
| 5,412,024 A | * 5/1995 | Okada et al. | 524/577 |
| 5,476,695 A | * 12/1995 | Okada et al. | 428/1 |
| 5,530,213 A | * 6/1996 | Hartsock et al. | 181/240 |
| 5,620,549 A | * 4/1997 | Miyajima | 156/245 |
| 5,693,284 A | * 12/1997 | Mukawa | 264/513 |
| 5,699,835 A | 12/1997 | Nakagawa | 138/141 |
| 5,806,480 A | * 9/1998 | Maeda et al. | 123/184.57 |
| 5,851,456 A | * 12/1998 | Mukawa et al. | 264/40.1 |
| 5,964,194 A | * 10/1999 | Pontopiddan et al. | 123/184.42 |
| 6,024,188 A | * 2/2000 | Yamaguchi et al. | 123/184.21 |

(List continued on next page.)

FOREIGN PATENT DOCUMENTS

| | | | | |
|---|---|---|---|---|
| EP | 0 892 169 | | 1/1999 | |
| JP | 02-181063 | | 7/1990 | |
| JP | 02181063 A | * | 7/1990 | F02M/35/10 |
| JP | 229236 | * | 8/1992 | F02M/35/10 |
| JP | 10-274116 | | 3/1997 | |
| JP | 274116 | * | 10/1998 | F02M/35/10 |
| JP | 281025 | * | 10/1998 | F02M/35/10 |

OTHER PUBLICATIONS

Boney et al., Automotive Air Intake Manifold Application Using Nylon 6,6 Composite Material, SAE Technical Paper Series No. 1999–01–3011, SAE Brazil, VII International Mobility Technology Conference & Exhibit.

Tech Paper, "Maximize Sound Transmission Loss Through Double Wall System With optimized Coupling", 1997, SAE.

Primary Examiner—Hieu T. Vo
Assistant Examiner—Hai Huynh
(74) Attorney, Agent, or Firm—Keil & Weinkauf

(57) ABSTRACT

A co-injection molded air intake manifold shell comprises an inner and outer skin layer separated by a sound absorbing or sound insulation core. Each skin layer is composed of a polyamide resin which, optionally, contains glass fiber reinforcement and high specific gravity fillers such as barium sulfate or tungsten. The sound insulating core is composed of a high density material having a foam structure, such as a polyamide resin. Skin layers are provided with a plurality of pockets to permit distribution of localized lumped masses at predetermined locations tailored to increase noise transmission losses. A single layer air intake manifold shell having non-uniform thickness is also provided. The thickness of the single layer air intake manifold shell is larger over preselected noise sources of larger amplitude to maximize noise attenuation for a nominal air intake manifold shell thickness.

15 Claims, 4 Drawing Sheets

U.S. PATENT DOCUMENTS

| | | | |
|---|---|---|---|
| 6,077,907 A | 6/2000 | Raetzsch et al. | 525/191 |
| 6,116,206 A * | 9/2000 | Krentz | 123/198 E |
| 6,176,213 B1 * | 1/2001 | Arnegger | 123/184.61 |
| 6,321,708 B1 * | 11/2001 | Wehner et al. | 123/184.61 |
| 2001/0018120 A1 * | 8/2001 | Murakami et al. | 428/304.4 |
| 2001/0018485 A1 * | 8/2001 | Matsuoka et al. | 524/492 |
| 2002/0020383 A1 * | 2/2002 | Nakano et al. | 123/184.61 |
| 2003/0010566 A1 * | 1/2003 | Miyakawa et al. | 181/204 |

* cited by examiner

ENGINE NOISE BARRIER

BACKGROUND OF THE INVENTION

1. Field of the Invention

The present invention relates to sound attenuation systems that restrict airborne and structural-borne sound wave transmission; and more particularly, to an air intake manifold shell having a combination of compositional and structural features that significantly reduce engine induced noise.

2. Description of the Prior Art

Continued efforts to reduce vehicle weight and cost have led automobile manufactures to replace metal components with alternative materials. Plastic air intake manifolds represent one example of this trend. These air intake manifolds cost and weigh less thus reducing manufacturing costs while increasing fuel efficiency. Air intake manifolds currently sold to original equipment manufacturers are segregated into several feature categories. Significant feature categories typically considered include cost, temperature performance, aesthetics, recycling aspects and noise abatement performance.

While materials such as nylons have been used in air intake manifold applications, such attempts to meet automotive needs have encountered manufacturing and performance issues; there remains significant room for improvement in low cost noise abatement air intake manifolds. Because of the imminent noise radiation increase with plastic components, most engine systems require air intake manifolds or shields as a separate component. Typical materials used for acoustic shields are polyurethanes, foam and fiber pads, usually treated onto the plastic shell. These all require post injection molding operations and are therefore costly. In addition, the noise attenuation provided by such shields has been unsatisfactory.

Conventionally, noise has been reduced using air intake manifolds of the type described by increasing the surface density of the air intake manifold shell. In cases where a noise source is identified, stiffening ribs have been added, or the mass of the air intake manifold shell has been increased.

No one has taken the approach of incorporating the noise shielding function into the plastic component itself, such as utilizing co-injection technology, and vibration welding to improve noise abatement performance at a lower cost. Nor have superior sound transmission loss materials been used in air intake manifold shell fabrication.

Accordingly, there remains a need in the art for an air intake manifold having a compact, light-weight construction, improved noise absorption and attenuation characteristics, which operate collectively to reduce engine noise economically, in a highly reliable manner.

SUMMARY OF THE INVENTION

The present invention provides an improved air intake manifold shell that provides significantly improved noise reduction at low cost. Materials having superior sound transmission loss properties are combined with a barrier construction especially suited to provide increased absorption, and superior sound transmission loss properties.

In one embodiment, the invention provides a co-injection molded air intake manifold shell comprising an inner and outer layer separated by a sound-absorbing core. Each of the outer layers is composed of a polyamide resin. Preferably, the polyamide resin contains glass-fiber reinforcement and mineral filler such as barium sulfate. The inner layer is composed of a low-density, high damping material having a foam structure, and or dispersed high-density material such as a glass-fiber reinforced and mineral filled polyamide resin.

Optionally, the layers are provided with a plurality of blisters to distribute localized increased core thickness (pockets) at predetermined locations across the air intake manifold shell surface, the locations being selected to increase noise transmission losses. The noise transmission loss is further improved by introducing higher density materials into the localized pockets.

In an alternative embodiment, a double layer air intake manifold shell comprises an inner and outer layer separated by an air core.

In yet another embodiment, a single layer air intake manifold shell is comprised of a polyamide resin containing glass and mineral fillers such as barium sulfate or high damping carbon nano-tubes. Optionally, the single layer air intake manifold shell has non-uniform thickness. The thickness is preferably greatest over preselected areas from which emanate noise transmissions having larger amplitude, to increase noise transmission losses.

The present invention incorporates barrier and absorption technologies in plastic constructions thereby reducing overall noise transmittance while at the same time reducing space, weight and cost requirements of existing technologies.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
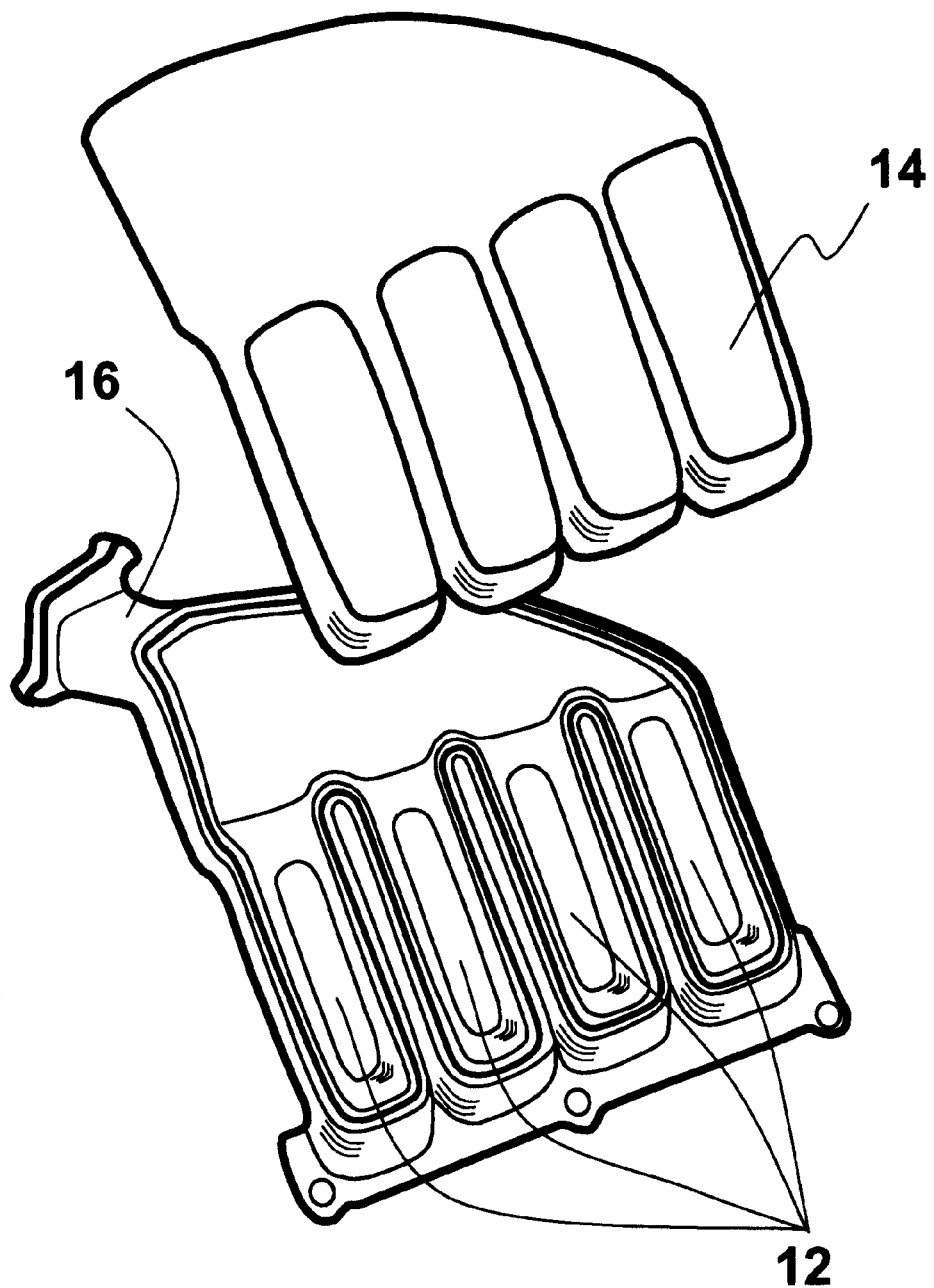
FIG. 1 is a perspective view illustrating a typical air intake manifold shell construction.

Sound attenuating thermoplastic materials designed for use as barrier systems in the automotive and consumer industries have certain acoustical characteristics that vary as functions of the stiffness and density of the barrier material. An important acoustic property for a barrier material is its sound transmission loss (STL). The STL determines the effectiveness of the material in attenuating unwanted noises. Accordingly, a barrier is a material that causes the sound wave to lose energy as the wave is transmitted through it. The sound transmission loss is the proportion of energy lost as a result of sound being transmitted through the material. In general, a higher STL means the barrier exhibits better noise attenuation performance.

While not being bound by any specific theory, the transmission loss coefficient is defined as:

$$\tau = \left(\frac{P_t}{P_i}\right)^2 \tag{1}$$

Where:

P_t=Transmitted sound power

P_i=Incident sound power

And the sound transmission loss in a specified frequency band is ten times the common logarithm of the ratio of the airborne incident sound power to the transmitted sound power, expressed in decibels:

$$STL = 10 \log 1/\tau \quad (2)$$

Conventional methods for reducing noise, as applied to a plate for example, comprise either increasing the surface density of the plate or, for cases wherein the noise source is identified, adding stiffening ribs or mass uniformly over substantially the entire surface area of the plate. In order to raise the sound transmission loss capability of a single panel or barrier made from such material and used as a partition barrier, its surface mass must be increased.

This is achieved according to the empirical mass-law equation:

$$STL = 20 \log_{10} \rho_s + 20 \log f - C \quad (3)$$

$\rho_s$=surface density of barrier in kg/m²

Where:

f=frequency in Hz

C=constant (in above units 47.2)

STL=Sound transmission Loss in dB

A typical single panel STL curve defines various frequency ranges and their effects on transmission loss. The STL performance can be grouped into three controlling regions.

These are:

1. Stiffness and resonance controlled region—less than 200 Hz;
2. Mass controlled region (Mass Law)—between 200 and the critical frequency, which ranges from about 5000 Hz to 20,000 Hz, depending on the parameters set forth in equation 4 hereinafter;
3. Wave coincidence (at the critical frequency) and stiffness controlled region—above the critical frequency.

The increase in surface mass tends to shift the critical frequency down. At this frequency, the incident sound wave couples with the bending wave in the panel, thus increasing the motion of the barrier, which is then transmitted, to the other side. This phenomenon causes a decrease in the sound transmission loss and hence is the dip in the STL curve as shown above. Having a lower critical frequency reduces the effective range of application of the material.

The critical frequency of a homogenous barrier is given by:

$$f_c = \frac{c^2}{2\pi}\sqrt{\frac{\rho_s}{B}} = \frac{c^2}{1.8 t}\left(\frac{\rho_m}{E}\right) \quad (4)$$

Where:

c=Speed of sound in the propagating medium, m/sec $\rho_s$=Surface density of the barrier, Kg/m²

B=Bending stiffness of the barrier per unit width N–m= Et³/12

E=Youngs Modulus of the barrier, N/m²

$\rho_m$=Volume density of the barrier, Kg/m³

One way to improve the STL performance significantly without necessarily increasing the "mass" is to have a double wall barrier construction. Recent developments in the Noise, Vibration and Harshness (NVH) technology field, indicate that double layer systems separated by air gaps offer exceptionally high noise barrier characteristics compared to a single panel.

The present invention provides an air intake manifold shell having superior noise abatement properties. It has been discovered that these superior noise abatement properties are afforded by air intake manifold shell constructions, which comprise:

a) a single layer of uniform thickness with optimized density and mass/thickness distribution;

b) a double layer separated by a sound absorbing core (sandwiched) layer;

c) a single or sandwich structure with optimally distributed lumped masses "local bumps" or "pocket blisters;" and d) a single layer structure with optimally distributed rib structures Engine air intake manifold shell structures a) and b) afford noise reduction according to the "mass law" theory, and the "double layer" theory, respectively. Core layers in case b) are air pockets, foam structure, high damping elastomer, and/or high-density materials. The core material that can be an absorption type material acts as a decoupler, since it decouples or isolates the two barrier walls from each other, and thereby aids in enhancing the STL performance. Case c) reduces noise by shifting the local natural frequencies away from the input driving frequency domain; lowering the frequency by adding lumped mass. Case d) reduces noise by shifting the frequency through stiffening the local area. The location and the number of the distributed masses and pockets can be optimized based on the nature of noise to filter out.

Use of a single layer structure having optimally distributed rib structures reduces noise by shifting the local natural frequencies away from preselected frequency components that are identified as undesirable sounds, such as rumbling, hissing and air rush noise. They lower the frequency by adding local ribs; increase the frequency by stiffening the local area.

The sound transmission loss (STL) behavior was tested on extruded sheets of Capron® 8233 nylon 6 from Honeywell sandwiched with a 6-mm air gap. Structures having this construction exhibited a substantial increase in sound barrier attenuation properties. The high performance of a double wall system takes place only after the system experiences double wall resonance. This phenomenon takes place due to the mass-air-mass resonance of the double wall, produced when the panels act as two masses connected by a spring or spacer. Double wall resonance frequency is given by:

$$f_{dw} = \frac{k_3}{\sqrt{wd}} \text{ Hz} \quad (5)$$

Where:

-continued $w$ = Equivalent surface density
   $= w_1 w_2 / (w_1 + w_2)$
$w_1 w_2$ = Surface density of individual barrier walls
$d$ = Thickness of the spacer material between the
   two barriers (assumption the weight of the
   spacer material is negligible)
$k_3$ = Constant
   = 42, if $w$ is in Kg/sq.m, and $d$ is in m
   = 120, if $w$ is in lb/sq.ft., and $d$ is in inch At frequencies lower than the $f_{dw}$, the double wall system behaves like a single wall having a mass equivalent to the sum of the masses of the two barriers. Therefore, in this region, the performance of the double wall and single wall systems is the same, provided the mass is the same. However, right at that frequency, sound transmission loss is decreased below that of a single barrier. For frequencies above the $f_{dw}$, the two walls decouple from each other, and the sound transmission loss increases significantly (18 dB/Octave theoretically) until it is limited by the critical frequency of either of the two panels. Thus, the double wall resonant frequency in the low frequency region, and the critical frequency of the individual walls at the high frequency limit the effectiveness of the double wall system.

At the $f_{dw}$ and cavity resonance (which is due to the physical size and shape of the air gap or cavity separating the two layers), a core layer with sound absorption properties can serve as a coupling material. This coupling material can significantly increase sound transmission loss, and introduce a damping effect to the mass-air-mass ($f_{dw}$) and cavity resonances. The sound absorbing property of the coupling material causes the sound wave amplitude to decay with distance. A general solution for the ratio of transmitted to incident sound pressure is then: (according to F. J. Fahy, Sound and Structural Vibration: Radiation, Transmission and Response—Academic, New York, 1987).

$$\frac{\tilde{P}_t}{\tilde{P}_i} = -\frac{4j\omega^3 \rho_0^2 c\gamma (\sinh\gamma d)^{-1}}{\gamma^2 \tilde{a}_1 \tilde{a}_2 - \omega\rho_0 y(\tilde{a}_1 + \tilde{a}_2)\coth\gamma d + \omega_0^2 \rho_0^2} \quad (6)$$

Where:

$\tilde{a}_2 = j\omega(\tilde{z}_1 + \rho_0 c)$
$\tilde{a}_2 = j\omega(\tilde{z}_2 + \rho_0 c)$
$\tilde{z}_1 = m_1(j\omega + \eta_1 \omega_1) - js_1/\omega$
$\tilde{z}_2 = m_2(j\omega + \eta_2 \omega_2) - js_2/\omega$
$\gamma$ = propagation constant of coupler
$\eta_{1,2}$ = mechanical loss factors of the barrier For large attenuation constants of the coupling material, the layers become decoupled. The low frequency mass-air-mass resonance becomes less pronounced. Similarly the sound absorption of the coupler suppresses cavity resonance. According to Fahy, the maximum pressure transmission ratio is:

$$\frac{\tilde{P}_t}{\tilde{P}_i} = -j\left(\frac{2\rho_0 c}{\omega m_1}\right)\left(\frac{2\rho_0 c}{\omega m_2}\right)\left(\frac{K}{\beta}\right)\exp(-\alpha d) \quad (7)$$

Which gives $$STL = TL(o_1 m_1) + TL(o_1 m_2) + 8.6\alpha d + 20\log_{10}\left(\frac{\beta}{K}\right) \quad (7)$$

The component 8.6αd (dB/m) corresponds to the transmission loss of the sound absorbing coupler.

As previously noted, one of the options for improving the performance of a barrier material is to increase the "mass" (or surface density) of the barrier. As has been demonstrated by previous studies, doubling the surface density of a barrier improves the STL performance by 6 dB. Further, doubling the surface density again improves the STL performance by 12 dB. This approach, may not be practical from manufacturing consideration as a significant weight and cost increase occurs. In addition to the increase in mass, the critical frequency of the material is lowered, which is not desirable. To establish a baseline, a program was written in Matlab release 11 to calculate theoretically and plot the STL curve based on varying thickness and property parameters. Next, newly developed grades of Nylon 6, having added thereto different levels of barium sulfate filler, were selected to calculate and plot the NVH performance at the single and double the mass configurations and against aluminum.

Capron® 8267 nylon 6 (15% glass fiber and 25% mineral) and Capron® 8233 nylon 6 (33% glass fiber) from Honeywell were selected, and compared against each other and aluminum in order to understand the specific gravity and density effects on the performance. The results showed that the performance of the two materials was equivalent (not a significant change in the specific gravity), but below that of aluminum due to the density effects.

The results show a significant improvement in the STL performance due to the composition of the new material. The STL were calculated for 24"×24" sheets using SAE J1400 formulae. The SAE J1400 based calculations were found to substantially agree with the theoretical field incidence calculated curve. For correlation purposes, the field incidence theoretical calculated TL's are interspersed with the experimental results.

STL tests were conducted on 3 mm thick panels. The samples tested are distributed according to the following:

| Sample No. | SAMPLE DESCRIPTION | Measured data Surf. Wt.: Kg/m² (lb/ft²) |
|---|---|---|
| 1 | XA2934 nylon 6 based polymer: Single Wall | 6.0 (1.2) |
| 2 | XA2935 nylon 6 based polymer: Single Wall | 6.3 (1.3) |
| 3 | 8233G HS BK 102 nylon 6 based polymer: Single Wall | 4.0 (0.8) |
| 4 | 8233G HS BK 102 nylon 6 based polymer: Double Wall (2 layers separated by 6 mm air gap) | 8.0 (1.6) |

A thin lead panel of 4.9 Kg/m² (1.0 lb/ft²) surface weight was used to compute the correlation factor as referenced in SAE J1400. The lowest usable frequency band of measurement for this test (in a 508 mm by 508 mm, or 20 inch by 20 inch opening) is 125 Hz (based on the 0.72 m or 2.36 ft) diagonal of the opening between the source room and the receiving room.

Measurements were made at six microphone locations in the source room and at one location 100 mm (4 inches) away from the sample, six times in the receiving room.

STL data obtained from the samples clearly show the increase in performance obtained using the new material over the existing Capron® 8233 resin material, for example. STL data was obtained for a single sheet of Capron® 8233 resin vs. the double wall design. The results clearly show the superior performance of the double wall system over the single wall structure. The critical frequency dips in the lower frequency region of the double wall system can be eliminated using an absorbing core layer. The high specific gravity of Capron® XA2935 resin has proven to exhibit high STL performance, and the double sheet configuration having 6 mm air gap proved to offer superior STL performance.

Co-injection molding is a process that creates a skin and core material arrangement in a molded part. The skin material is injected first into the mold cavity, and is immediately followed by a core material. As the skin material flows into the cavity, the material next to the cavity walls freezes and material flows down a center channel. When the core material enters it displaces the skin material in the center of the channel by pushing the skin ahead. As it flows ahead of the core material, the skin material continues to freeze on the walls producing the skin layer.

FIG. 1 shows a perspective view of a typical air intake manifold 10. Air intake manifold 10 comprises a plurality of shells welded into one assembly; air intake manifold 10 is constructed of multiple runners 12 and plenum 14. Air enters plenum 14 through the throttle body neck 16, to be distributed into runners 12, which feed the air into the engine cylinders (not shown).

Figure 2:
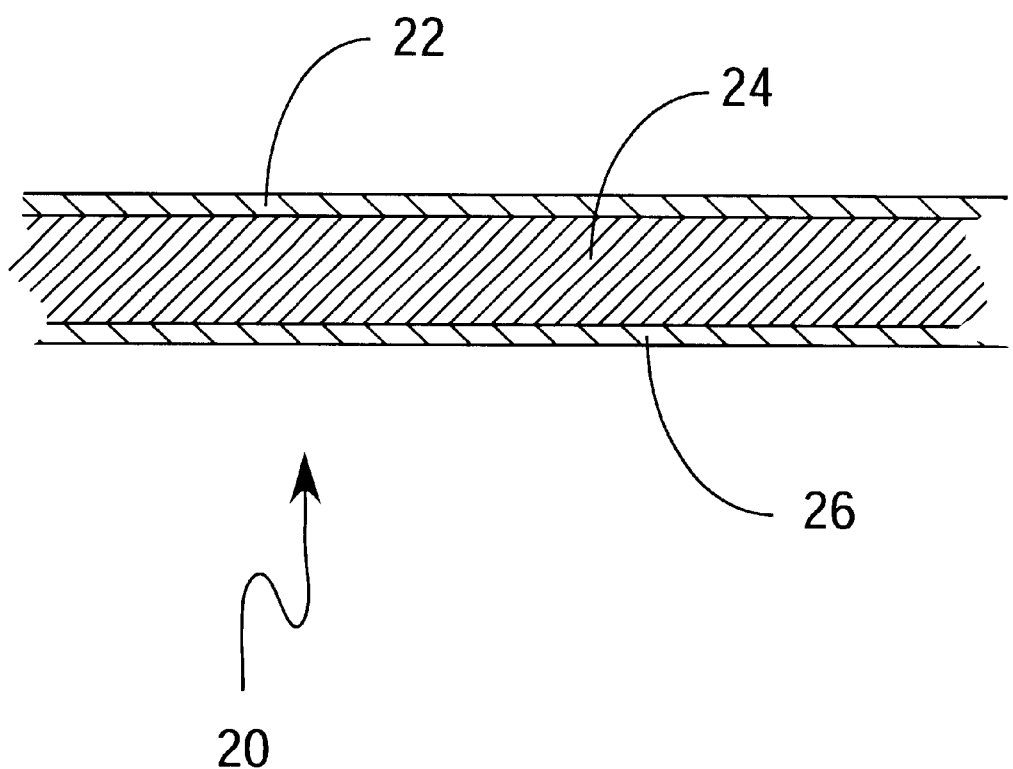
FIG. 2 is a cross sectional view depicting a co-injected air intake manifold shell.

FIG. 2 shows a cross sectional view of a co-injection molded multi-layer air intake manifold shell 20. Air intake manifold shell 20 comprises outer layer 22; sound absorbing core 24; and inner layer 26. Preferably, inner layer 26 and/or outer layer 22 comprises a polyamide resin comprising a nylon resin, a high specific gravity filler, optionally a reinforcement fiber and optionally an elastomer. The polyamide preferably comprises at least one of nylon 6, nylon 6/6 and nylon 6/66. The high specific gravity filler preferably comprises a mineral and/or a metal filler, more preferably at least one of barium sulfate and tungsten. The elastomer, if present, preferably comprises at least one of functionalized ethylene-propylene copolymer, functionalized styrene-ethylene butadiene-styrene copolymer and metal salt neutralized ethylene methylacrylic acid di- and ter-polymers. The reinforcement fiber, if present, preferably comprises at least one of glass fibers, carbon fibers and steel fibers. Preferably, the polyamide is present in an amount of from about 20 to about 45 wt. % and the high specific gravity filler ranges from about 40 to about 70 wt. %. The reinforcement fiber may be present in amounts up to about 30 wt. % and the elastomer ranges up to about 10 wt. %. One polyamide resin found especially well suited for use as inner layer 26 and/or outer layer 24 is Capron® XA2935 resin containing glass fibers and mineral filler. Preferably, the mineral filler has a specific gravity in the range of 4–20, such as barium sulfate or tungsten. In the Capron® XA2935 resin, barium sulfate is present in an amount substantially equal to about 53% by weight, and the amount of the glass fiber reinforcement is substantially equal to about 15% by weight. Core 24 is alternatively comprised of a low-density material, such as a polyamide resin, having a foam structure. The foam structure can be either open- or closed-cell in nature, and produced by either chemical or physical blowing agent(s), known in the art, introduced into the polyamide resin either in the pellet or melt state. The foam cell structure would have an average diameter range of from the order of one micron (i.e. via MuCell process) to as large as one centimeter. The range in reduction of density of the polyamide resin as a result of the foaming process would be 10 to 70%.

Preferably, core 24 is comprised of a high damping elastomer, such as specific types of thermoplastic elastomers and thermoplastic polyurethanes available commercially, which are capable of being co-injection molded with the polyamide resin. One high damping elastomer found to be especially well suited for use as core layer is a polyamide-based Santoprene, used alone or in-combination with high damping 'carbon nanotubes'.

Figure 3:
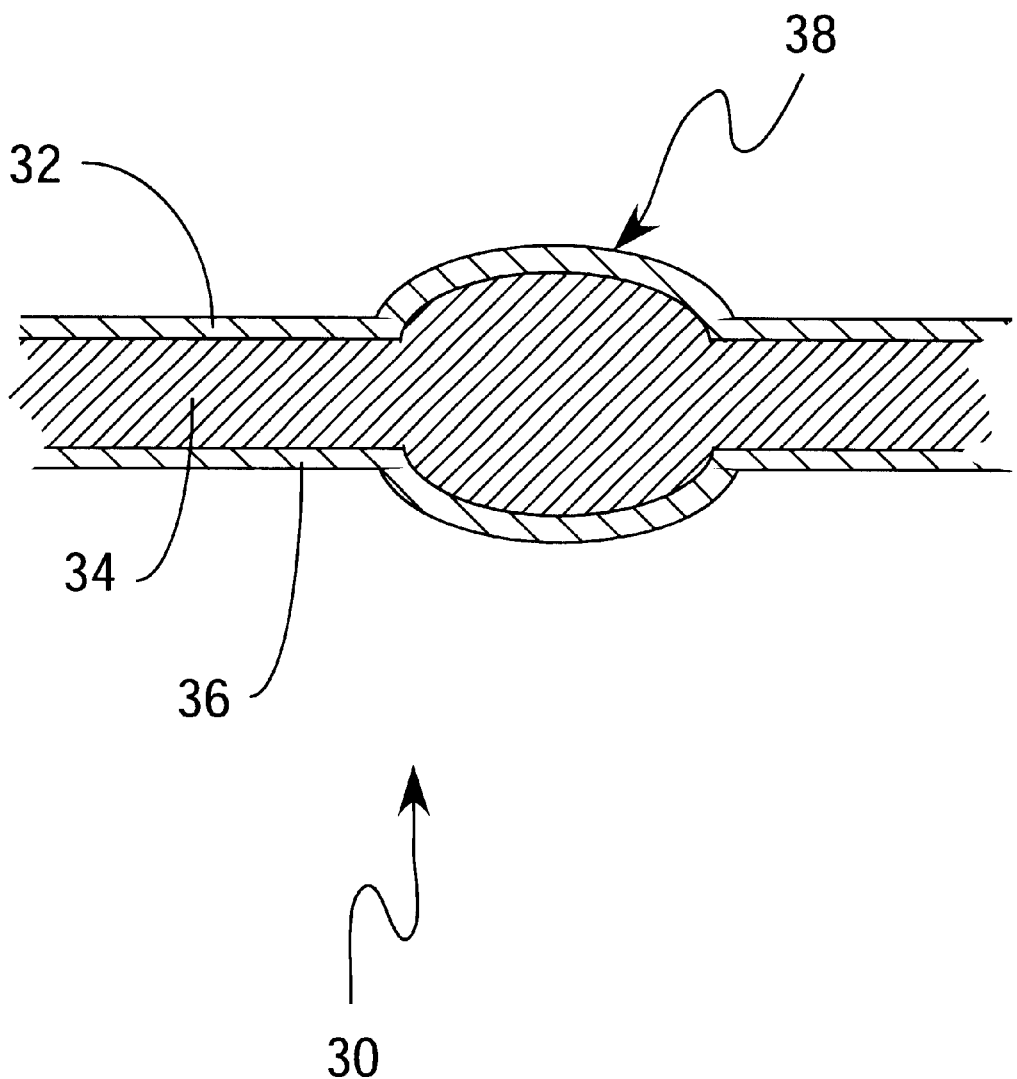
FIG. 3 is a cross sectional view of a co-injected air intake manifold shell provided with a blister.

Optionally the section of the air intake manifold shell, shown generally at 30 in FIG. 3, is provided with a plurality of blisters 38 to distribute localized increased core thickness at predetermined locations over air intake manifold shell 30. Such an arrangement of blisters 38 on air intake manifold shell 30 increases the mass effect. As shown by FIG. 3, the shell 30 has an outer layer 32, a sound absorbing core 34, and an inner layer 36. The locations of blisters 38 are selected to increase noise transmission losses. Noise is reduced by shifting the local natural frequencies away from the input driving frequency domain and lowering the frequency by adding lumped mass. The location and the number of the distributed masses or blisters can be optimized based on the locus and amplitude of noise appointed to be filtered out.

Figure 4:
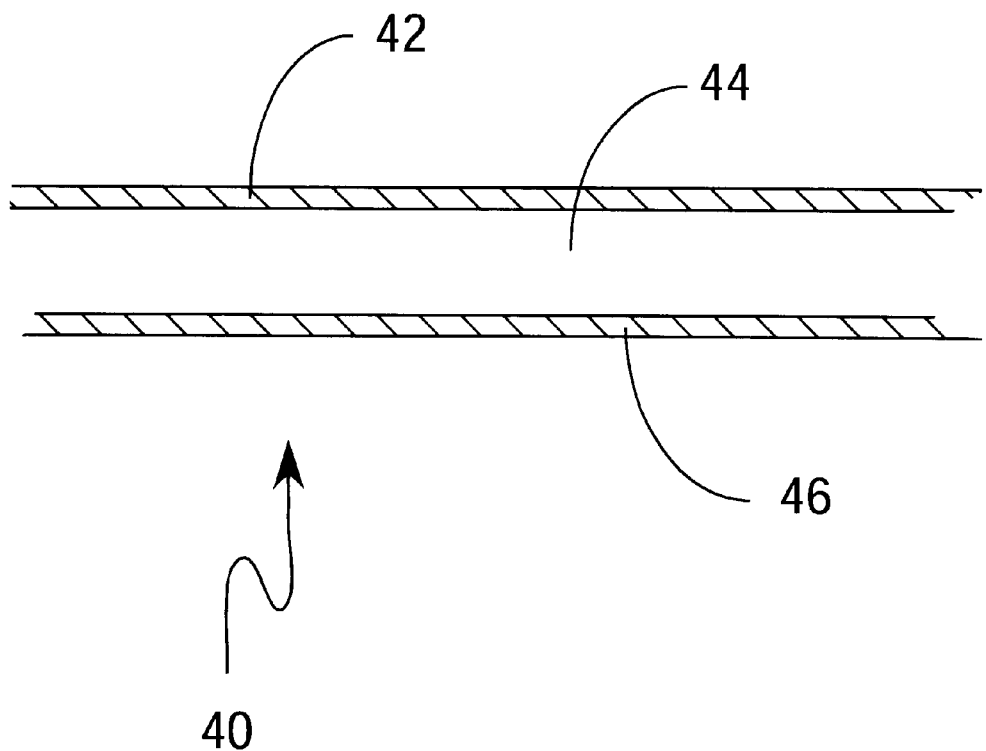
FIG. 4. is a cross sectional view depicting a two-layer air intake manifold shell having an air core.

In FIG. 4 there is shown another embodiment of the invention. A cross-section of an air intake manifold shell is shown in the figure. Double layer air intake manifold shell, shown generally at 40, comprises inner layer 46 and outer layer 42 of polyamide resin separated by air core 44. Preferably the air gap has a thickness ranging from about 1 about 25 mm, and the polyamide resin layers contain glass fiber reinforcement and mineral filler. The mineral filler is preferably barium sulfate, present in an amount of about from 40 to about 70% by weight of the polyamide resin composition. The amount of the glass fiber reinforcement present ranges from about 0 to about 30% by weight of the composition.

In yet another embodiment of the invention, the air intake manifold shell comprises a single layer of Capron® XA2935 resin to achieve superior noise abatement. Optionally, the air intake manifold shell thickness is not uniform. Air intake manifold shell portions having increased thickness are positioned over predetermined areas to increase noise transmission losses by increasing the mass effect. Each of the locations is selected to maximize noise attenuation over larger amplitude transmission points, thereby providing increased noise transmission losses over substantially the entire surface area of the air intake manifold shell. This arrangement of the thicker air intake manifold shell portions reduces noise by shifting the local natural frequencies away from the input driving frequency domain and lowering the frequency by adding lumped mass. Tailoring the location and the number of the distributed masses permits optimum noise attenuation for a given air intake manifold weight, size and thickness. The air intake manifold can be constructed economically using a minimum of material, and is small, light, efficient, and highly reliable in operation.

Having thus described the invention in rather full detail, it will be understood that such detail need not be strictly adhered to, but that additional changes and modifications may suggest themselves to one skilled in the art, all falling within the scope of the invention as defined by the subjoined claims.

We claim:

1. A multi-layer engine air intake manifold shell, comprising:
   a. an outer layer for providing structural rigidity to said air intake manifold shell;
   b. a sound absorbing core for dissipating sound energy, said core being comprised of a material having a specific gravity ranging from about 4 to 20; and
   c. an inner layer for providing structural rigidity and heat resistance to said air intake manifold shell.

2. An air intake manifold shell as recited by claim 1, wherein at least one of said inner and said outer layers comprises a polyamide resin.

3. An air intake manifold shell as recited by claim 2, wherein said polyamide resin comprises a high specific gravity filler and, optionally, glass fibers for reinforcement.

4. An air intake manifold shell as recited by claim 3, wherein said filler has comprises a mineral and/or a metal filler.

5. An air intake manifold shell as recited in claim 4, wherein said filler comprises at least one of barium sulfate and tungsten.

6. An air intake manifold shell as recited by claim 5, wherein the amount of said high specific gravity filler comprises from about 40 to about 70% by weight of said polyamide resin.

7. An air intake manifold shell as recited by claim 3, wherein said reinforcement comprises glass fiber present in an amount ranging up to about 30% by weight of said polyamide resin.

8. An air intake manifold shell as recited in claim 3, wherein said polyamide resin further comprises an elastomer.

9. An air intake manifold shell as recited in claim 8, wherein said elastomer comprises at least one of one of functionalized ethylene-propylene copolymer, functionalized styrene-ethylene butadiene-styrene copolymer and metal salt neutralized ethylene methylacrylic acid di- and ter-polymers.

10. An air intake manifold shell as recited in claim 9, wherein said elastomer is present in an amount up to about 10 wt. % of said polyamide resin.

11. An air intake manifold shell as recited in claim 2, wherein at least one of said inner and said outer layers is formed from composition comprising a polyamide resin comprised of at least one of nylon 6, nylon 6/6 and nylon 6/66; a high specific gravity filler comprising at least one of barium sulfate and tungsten; glass fiber reinforcement; and an elastomer comprising at least one of functionalized ethylene-propylene copolymer, functionalized styrene-ethylene butadiene-styrene copolymer and metal salt neutralized ethylene methylacrylic acid di- and ter-polymers.

12. An air intake manifold shell as recited by claim 1, wherein said core is further comprised of a foam structure.

13. An air intake manifold shell as recited by claim 12, wherein said foam structure is comprised of a foamed polyamide resin.

14. An air intake manifold shell as recited by claim 1, wherein said core is further comprised of a high damping elastomer.

15. A multi-layer engine air intake manifold shell comprising:
   a. an outer layer for providing structural rigidity to said air intake manifold shell;
   b. a sound absorbing core for dissipating sound energy, said core being comprised of a material having a specific gravity ranging from about 4 to 20; and
   c. an inner layer for providing structural rigidity and heat resistance to said air intake manifold shell,
   wherein said layers are provided with a plurality of pockets that permit distribution of localized lumped masses at predetermined locations over said air intake manifold shell, said locations being selected to increase noise transmission losses, and to shift resonance frequencies away from preselected regions of undesirable frequencies identified as rumbling, hissing and air rush noises.

\* \* \* \* \*